No. 697,845. Patented Apr. 15, 1902.
C. A. W. HULTMAN.
CONDUIT FOR ELECTRIC OR LIKE CABLES.
(Application filed Jan. 9, 1902.)
(No Model.)
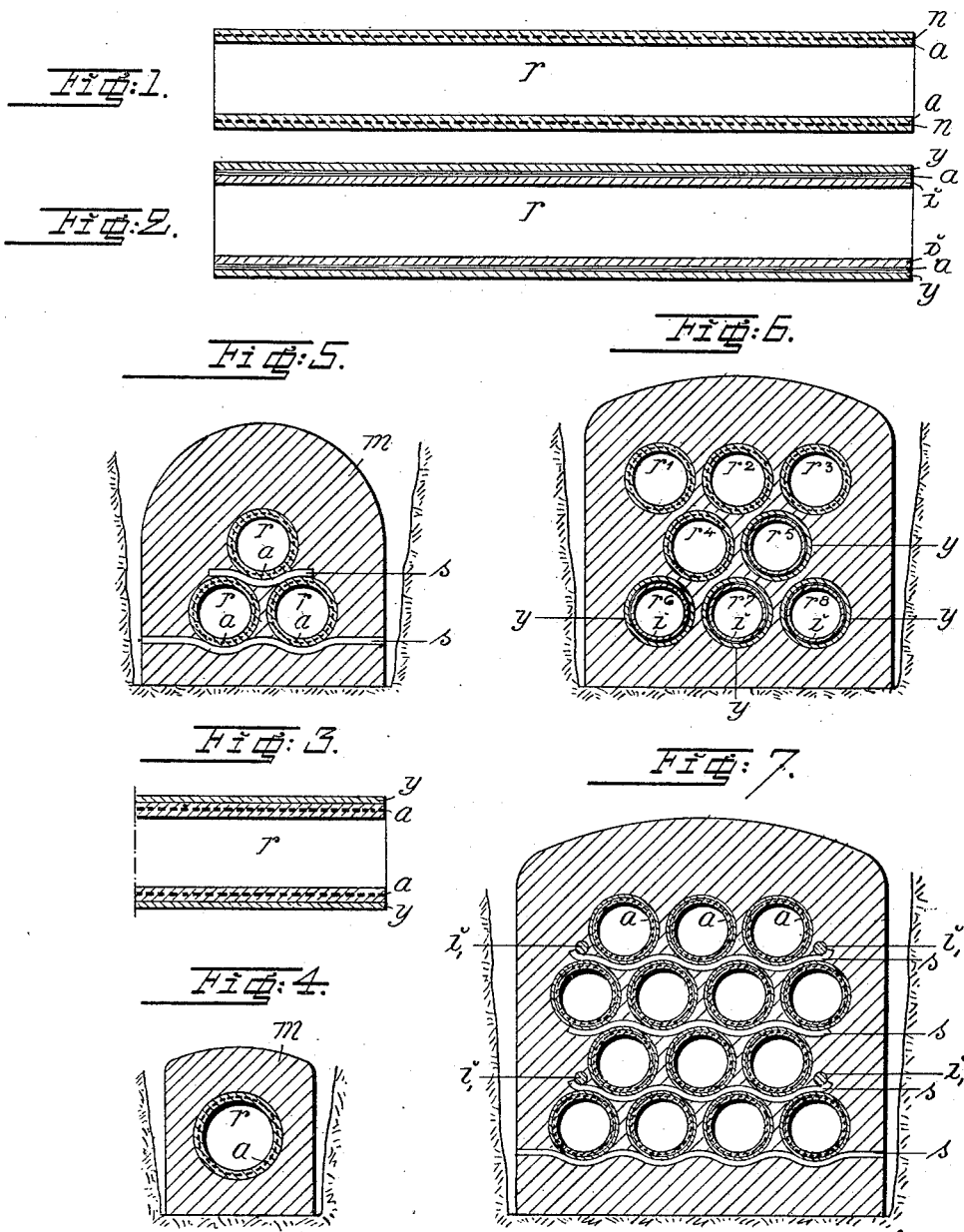
Inventor.
Carl Axel Wilhelm Hultman.

UNITED STATES PATENT OFFICE.

CARL AXEL WILHELM HULTMAN, OF STOCKHOLM, SWEDEN.

CONDUIT FOR ELECTRIC OR LIKE CABLES.

SPECIFICATION forming part of Letters Patent No. 697,845, dated April 15, 1902.

Application filed January 9, 1902. Serial No. 89,051. (No model.)

*To all whom it may concern:*

Be it known that I, CARL AXEL WILHELM HULTMAN, a subject of the King of Sweden and Norway, residing at Stockholm, Sweden, have invented certain new and useful Improvements in Conduits for Electric or Like Cables; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to conduits for electric and like cables, and more especially to conduits constructed of tubes suitably connected with each other and through which the cables are drawn, the said tubes being either laid direct in the ground or protected by means of an appropriate hardening cover, such as cement or the like.

In order to provide a conduit of the kind which shall occupy as little space as possible, and thereby be of special advantage for various reasons, it is necessary to make the tubes as thin as possible. For the purpose of insuring the required strength and stability of the tubes it is advantageous to manufacture them of hard-setting material—such as cement, asphalt, or the like—and to provide the same with a lining or insertion of canvas, metal gauze, sheeting, paper, or the like, which may be applied in a smooth, fluted, or corrugated form.

A conduit constructed according to my invention is illustrated in the accompanying drawings, in which—

Figure 1 is a longitudinal section of a cable used in the construction of conduits. Figs. 2 and 3 are longitudinal sections showing modifications of the tubes. Fig. 4 is a transverse section of a conduit constructed of a single tube. Fig. 5 is a transverse section of a conduit constructed of three tubes surrounded by a hardened mass. Fig. 6 is a similar view showing a conduit made up of a plurality of tubes of different construction; Fig. 7, a like view showing a modified form of constructing a conduit.

$r$ designates a cable-tube constructed of a hard material $n$, such as cement or asphalt, in which is embedded a reticulated lining $a$, (shown in Fig. 1,) or the tube may be constructed with a plain body portion $a$, which may have either a smooth, fluted, or corrugated surface and an inner coating $i$ of cement and an outer coating $y$ of asphalt, as shown in Fig. 2. The tube shown in Fig. 3 is similar to that shown in Fig. 1, with the addition of an outer cover $y$ of asphalt. The tubes thus formed are connected together by means of sockets or otherwise and are embedded in the ground or surrounded with a protecting hardening mass $m$—such, for example, as a mixture of Portland cement and sand—as shown in Figs. 4 to 7.

For the purpose of strengthening the protecting mass $m$ around the tubes and at the same time facilitate the laying of said tubes it is advantageous to provide suitable intermediate corrugated bars $s$. The protecting material may also be further strengthened in the longitudinal direction by iron rods $i$, placed on the free ends of the corrugated bars before the protecting mass is run in.

The conduits may be utilized under ground as well as above wherever it is desired to inclose cables in tubes.

Having thus described my invention, what I claim, and desire to secure by Letters Patent, is—

1. A conduit for electric cables comprising a plurality of tubes, transversely-arranged bars interposed between said tubes, longitudinally-arranged rods connecting the free ends of said bars and a protecting mass inclosing the tubes, substantially as and for the purpose specified.

2. A conduit for electric cables comprising a plurality of tubes formed with an inner lining of cement, a reticulated body embedded therein, an asphalt coating inclosing said lining transversely-arranged bars interposed between said tubes, longitudinally - arranged rods connecting said bars at their ends, and a hardening mass inclosing said tubes and rods, substantially as and for the purpose specified.

In testimony that I claim the foregoing as my invention I have signed my name in presence of two subscribing witnesses.

CARL AXEL WILHELM HULTMAN.

Witnesses:
 E. OLTMAN,
 TH. WAWRINSKY.